(12) United States Patent
Gaulin et al.

(10) Patent No.: US 10,260,423 B2
(45) Date of Patent: Apr. 16, 2019

(54) TOWERSHAFT SUPPORT

(71) Applicant: UNITED TECHNOLOGIES CORPORATION, Farmington, CT (US)

(72) Inventors: Todd M. Gaulin, Coventry, CT (US); Dwayne E. Messerschmidt, Dawsonville, GA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 176 days.

(21) Appl. No.: 15/490,485

(22) Filed: Apr. 18, 2017

(65) Prior Publication Data
US 2018/0298821 A1  Oct. 18, 2018

(51) Int. Cl.
| | |
|---|---|
| *F02C 7/32* | (2006.01) |
| *F02C 7/20* | (2006.01) |
| *F02C 7/06* | (2006.01) |
| *F16H 57/04* | (2010.01) |
| *F16H 57/021* | (2012.01) |
| *F16H 1/14* | (2006.01) |
| *F16H 57/025* | (2012.01) |
| *F01D 25/18* | (2006.01) |

(Continued)

(52) U.S. Cl.
CPC ............. *F02C 7/20* (2013.01); *F01D 25/18* (2013.01); *F01D 25/28* (2013.01); *F02C 7/06* (2013.01); *F02C 7/32* (2013.01); *F16H 1/14* (2013.01); *F16H 57/021* (2013.01); *F16H 57/025* (2013.01); *F16H 57/046* (2013.01); *F16H 57/0424* (2013.01); *F16H 57/0495* (2013.01); *F02C 3/04* (2013.01); *F05D 2220/32* (2013.01); *F05D 2260/4031* (2013.01); *F05D 2260/98* (2013.01)

(58) Field of Classification Search
CPC ...... F02C 7/36; F02C 7/06; F02C 3/04; F02C 7/32; F16H 57/0424; F16H 57/046; F16H 57/021; F16H 57/0495; F16H 57/042; F16H 1/14; F05D 2220/32; F05D 2260/4031; F01D 25/18; F01D 25/16
USPC .................. 415/122.1, 108, 213.1; 184/6.12
See application file for complete search history.

(56) References Cited

U.S. PATENT DOCUMENTS

| | | | |
|---|---|---|---|
| 8,201,389 | B2 | 6/2012 | Eleftheriou et al. |
| 8,511,967 | B2 | 8/2013 | Suciu et al. |

(Continued)

FOREIGN PATENT DOCUMENTS

EP     2481887     8/2012

OTHER PUBLICATIONS

European Patent Office, European Search Report dated Sep. 9, 2018 in Application No. 18167915.0-1007.

*Primary Examiner* — Marguerite McMahon
(74) *Attorney, Agent, or Firm* — Snell & Wilmer, L.L.P.

(57) ABSTRACT

A towershaft support may comprise a mount support, and a mounting ring coupled to an aft portion of the mount support radially inward of the mount support, wherein the mounting ring and the mount support create a perimeter around a central void. The mounting ring may comprise a mounting flange on an outer diameter of the mounting ring and a fluid passageway on an inner diameter of the mounting ring fixedly coupled to the mounting flange, wherein the fluid passageway comprises an outer wall enclosing an internal passage configured to pass fluid therethrough.

20 Claims, 5 Drawing Sheets

(51) Int. Cl.
*F01D 25/28* (2006.01)
*F02C 3/04* (2006.01)

(56) References Cited

U.S. PATENT DOCUMENTS

| | | | |
|---|---|---|---|
| 10,125,724 B2 * | 11/2018 | Roberge | F02K 3/075 |
| 2003/0115885 A1 * | 6/2003 | MacFarlane | F02C 6/206 |
| | | | 60/793 |
| 2008/0240917 A1 * | 10/2008 | Eleftheriou | F01D 5/22 |
| | | | 415/213.1 |
| 2016/0138414 A1 | 5/2016 | Armange | |
| 2016/0138476 A1 | 5/2016 | Lemarchand et al. | |
| 2017/0044987 A1 | 2/2017 | Curlier et al. | |

* cited by examiner

US 10,260,423 B2

TOWERSHAFT SUPPORT

FIELD

This disclosure generally relates to towershaft supports in engines.

BACKGROUND

Towershaft supports may provide support for the tower shaft(s) and engine structure of an engine (e.g., a gas turbine engine). Additionally, a towershaft support may provide a structure to which fluid (e.g., oil) distribution tubing may be coupled to provide oil to various portions of the engine, such as gears and bearings. However, engines may need oil or other fluids in multiple locations, which is associated with multiple tubes and tubing systems being disposed on or coupled to the towershaft support, which can be bulky and complex.

SUMMARY

In various embodiments, a towershaft support may comprise a mount support, and a mounting ring coupled to an aft portion of the mount support radially inward of the mount support relative to a central axis, wherein the mounting ring and the mount support create a perimeter around a central void. The mounting ring may comprise a mounting flange on an outer diameter of the mounting ring and a fluid passageway on an inner diameter of the mounting ring fixedly coupled to the mounting flange, wherein the fluid passageway comprises an outer wall enclosing an internal passage configured to pass fluid therethrough.

In various embodiments, the fluid passageway may comprise at least one fluid inlet and at least one fluid outlet in fluid communication with the internal passage. In various embodiments, the fluid inlet is disposed between a first fluid outlet and a second fluid outlet of the fluid passageway. In various embodiments, the mount support comprises a towershaft mount disposed on the mount support. In various embodiments, the mounting flange comprises at least one mounting hole configured to facilitate coupling of the towershaft support to an engine structure.

In various embodiments, a gas turbine engine may comprise an engine structure, a towershaft, and a towershaft support coupled to the engine structure and the towershaft. The towershaft support may comprise a mount support, and a mounting ring coupled to an aft portion of the mount support radially inward of the mount support relative to a central axis, wherein the mounting ring and the mount support create a perimeter around a central void. The mounting ring may comprise a mounting flange on an outer diameter of the mounting ring and a fluid passageway on an inner diameter of the mounting ring fixedly coupled to the mounting flange, wherein the fluid passageway comprises an outer wall enclosing an internal passage configured to pass fluid therethrough.

In various embodiments, the mounting flange may comprise at least one mounting hole. In various embodiments, the gas turbine engine may further comprise a fastener disposed through the at least one mounting hole coupling the mounting flange to the engine structure. In various embodiments, the fluid passageway may comprise at least one fluid inlet and at least one fluid outlet in fluid communication with the internal passage. In various embodiments, the gas turbine engine may further comprise a bevel gear and a bull gear coupled to the towershaft, and a jumper tube coupled to the at least one fluid outlet, wherein the jumper tube is configured to transport fluid from the internal passage to at least one of the bevel gear and the bull gear. In various embodiments, the gas turbine engine may further comprise a nozzle fluidly coupled to the at least one fluid outlet configured to spray fluid.

In various embodiments, the fluid inlet may be disposed between a first fluid outlet and a second fluid outlet of the fluid passageway. In various embodiments, the mount support may comprise a towershaft mount disposed on the mount support. The towershaft may be disposed through the towershaft mount. In various embodiments, the gas turbine engine may further comprise fluid distribution hardware fluidly coupled to the internal passage.

In various embodiments, a method for distributing fluid to components of a gas turbine engine may comprise receiving a fluid through a fluid inlet of a fluid passageway of a mounting ring, wherein the fluid passageway comprises an internal passage in fluid communication with the fluid inlet, wherein the mounting ring is part of a towershaft support, and wherein the mounting ring further comprises a mounting flange fixedly coupled to the fluid passageway; and passing the fluid through the internal passage and out a fluid outlet of the fluid passageway fluidly coupled to the internal passage. In various embodiments, the method may further comprise passing the fluid to the fluid inlet from fluid distribution hardware. In various embodiments, the method may further comprise passing the fluid through a jumper tube in fluid communication with the fluid outlet in response to passing the fluid out the fluid outlet. In various embodiments, the method may further comprise applying the fluid to at least one of a bevel gear and a bull gear in response to the passing the fluid through the jumper tube. In various embodiments, the method may further comprise passing the fluid through a second fluid outlet of the fluid passageway that is fluidly coupled to the internal passage.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures. Elements with the like element numbering throughout the figures are intended to be the same.

DETAILED DESCRIPTION

All ranges may include the upper and lower values, and all ranges and ratio limits disclosed herein may be combined. It is to be understood that unless specifically stated otherwise, references to "a," "an," and/or "the" may include one or more than one and that reference to an item in the singular may also include the item in the plural.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, and mechanical changes may be made without departing from the scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Figure 1:
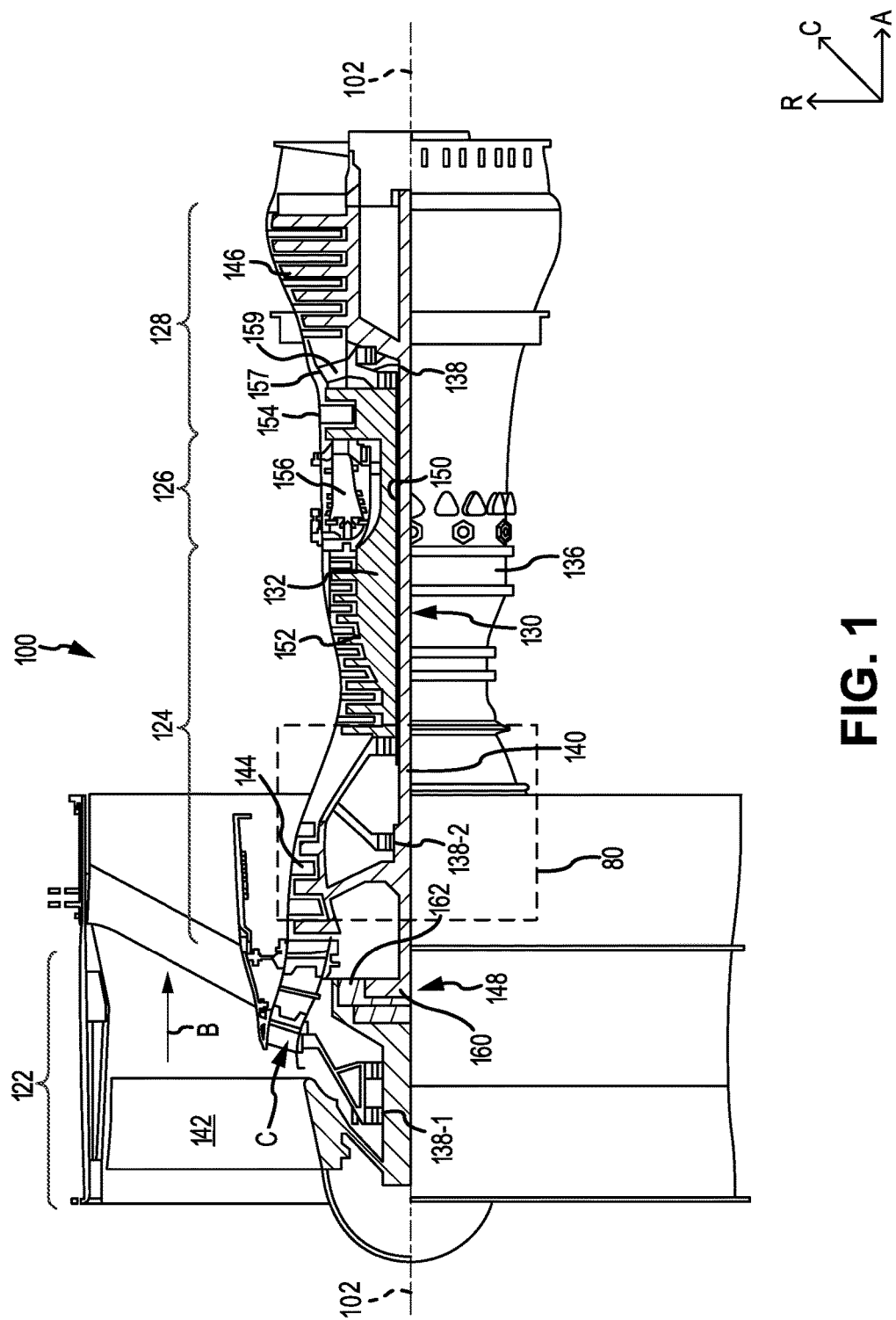
FIG. 1 illustrates a cross-sectional view of an exemplary gas turbine engine, according to various embodiments.

In various embodiments, and with reference to FIG. 1, a gas turbine engine 100 is disclosed. As used herein, "aft" refers to the direction associated with a tail (e.g., the back end) of an aircraft, or generally, to the direction of exhaust of gas turbine engine 100. As used herein, "forward" refers to the direction associated with a nose (e.g., the front end) of the aircraft, or generally, to the direction of flight or motion. An A-R-C axis has been included to illustrate the axial (A), radial (R) and circumferential (C) directions. For clarity, axial axis A spans parallel to central axis 102. As utilized herein, radially inward refers to the negative R direction towards central axis 102, and radially outward refers to the R direction away from central axis 102.

Gas turbine engine 100 may comprise a two-spool turbofan that generally incorporates a fan section 122, a compressor section 124, a combustor section 126, and a turbine section 128. Gas turbine engine 100 may also comprise, for example, an augmenter section, and/or any other suitable system, section, or feature. In operation, fan section 122 may drive air along a bypass flow-path B, while compressor section 124 may further drive air along a core flow-path C for compression and communication into combustor section 126, before expansion through turbine section 128. FIG. 1 provides a general understanding of the sections in a gas turbine engine, and is not intended to limit the disclosure. The present disclosure may extend to all types of applications and to all types of turbine engines, including, for example, turbojets, turboshafts, and three spool (plus fan) turbofans wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

In various embodiments, gas turbine engine 100 may comprise a low speed spool 130 and a high speed spool 132 mounted for rotation about an central axis 102 relative to an engine static structure 136 via one or more bearing systems 138 (shown as, for example, bearing system 138-1 and bearing system 138-2 in FIG. 1). It should be understood that various bearing systems 138 at various locations may alternatively or additionally be provided, including, for example, bearing system 138, bearing system 138-1, and/or bearing system 138-2.

In various embodiments, low speed spool 130 may comprise an inner shaft 140 that interconnects a fan 142, a low pressure (or a first) compressor section 144, and a low pressure (or a second) turbine section 146. Inner shaft 140 may be connected to fan 142 through a geared architecture 148 that can drive fan 142 at a lower speed than low speed spool 130. Geared architecture 148 may comprise a gear assembly 160 enclosed within a gear housing 162. Gear assembly 160 may couple inner shaft 140 to a rotating fan structure. High speed spool 132 may comprise an outer shaft 150 that interconnects a high pressure compressor ("HPC") 152 (e.g., a second compressor section) and high pressure (or a first) turbine section 154. A combustor 156 may be located between HPC 152 and high pressure turbine 154. A mid-turbine frame 157 of engine static structure 136 may be located generally between high pressure turbine 154 and low pressure turbine 146. Mid-turbine frame 157 may support one or more bearing systems 138 in turbine section 128. Inner shaft 140 and outer shaft 150 may be concentric and may rotate via bearing systems 138 about central axis 102. As used herein, a "high pressure" compressor and/or turbine may experience a higher pressure than a corresponding "low pressure" compressor and/or turbine.

In various embodiments, the air along core airflow C may be compressed by low pressure compressor 144 and HPC 152, mixed and burned with fuel in combustor 156, and expanded over high pressure turbine 154 and low pressure turbine 146. Mid-turbine frame 157 may comprise airfoils 159 located in core airflow path C. Low pressure turbine 146 and high pressure turbine 154 may rotationally drive low speed spool 130 and high speed spool 132, respectively, in response to the expansion.

In various embodiments, gas turbine engine 100 may comprise a high-bypass ratio geared aircraft engine. The bypass ratio of gas turbine engine 100 may also be greater than ten (10:1). Geared architecture 148 may be an epicyclic gear train, such as a star gear system (sun gear in meshing engagement with a plurality of star gears supported by a carrier and in meshing engagement with a ring gear) or other gear system. Geared architecture 148 may have a gear reduction ratio of greater than about 2.3 and low pressure turbine 146 may have a pressure ratio that is greater than about five (5). The diameter of fan 142 may be significantly larger than that of the low pressure compressor section 144, and the low pressure turbine 146 may have a pressure ratio that is greater than about five (5:1). The pressure ratio of low pressure turbine 146 is measured prior to inlet of low pressure turbine 146 as related to the pressure at the outlet of low pressure turbine 146. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in high pressure compressor 152 than are conventionally experienced. These higher operating temperatures and pressure ratios create operating environments that cause thermal loads that are higher than the thermal loads conventionally experienced, which may shorten the operational life of current components.

Figure 2:
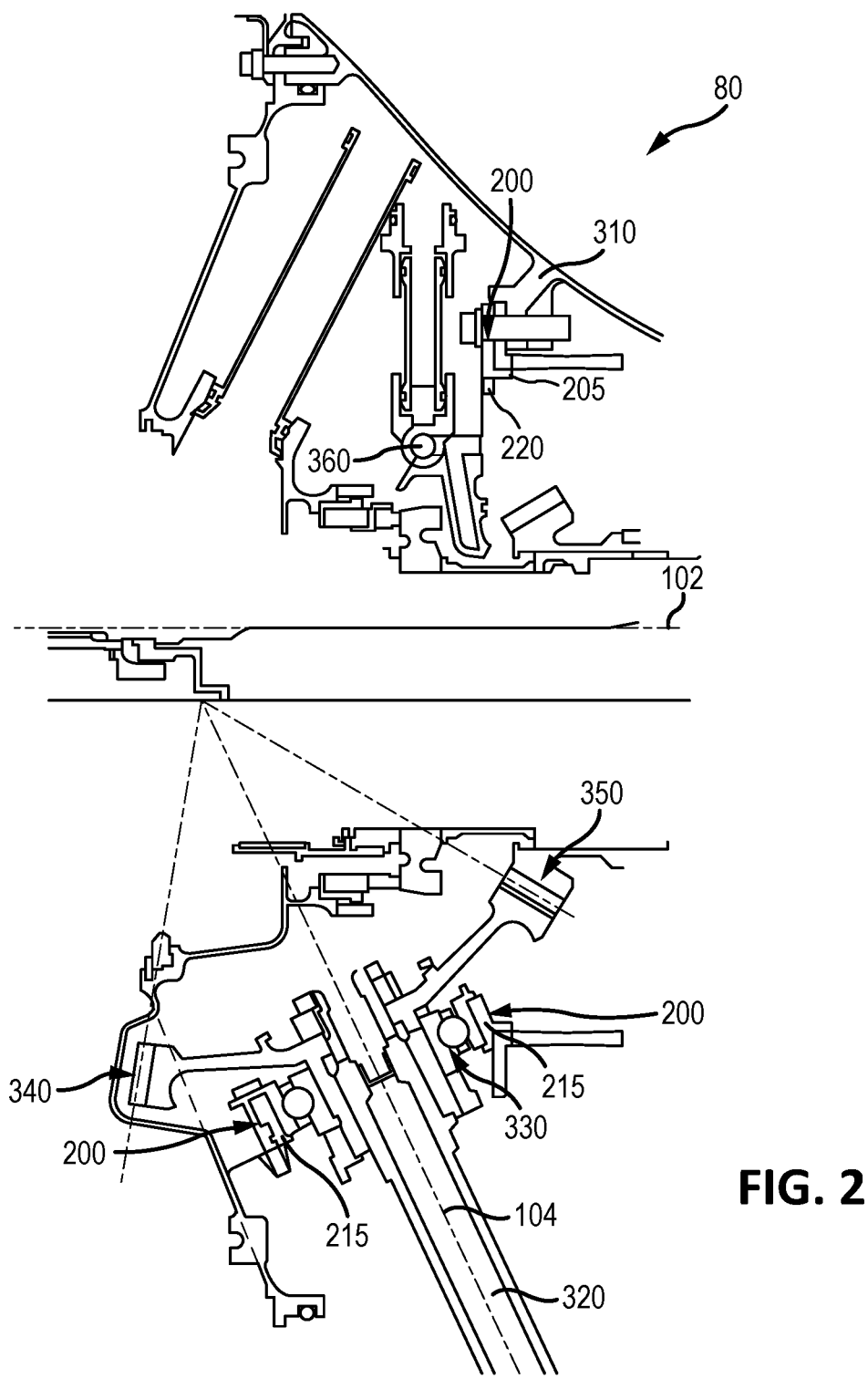
FIG. 2 illustrates a mid bearing compartment of a gas turbine engine, in accordance with various embodiments.

In various embodiments, gas turbine engine 100 may comprise a mid bearing compartment 80, which may comprise various bearings, gears, supports, and/or engine structural components. With combined reference to FIGS. 1 and 2, a mid bearing compartment 80 of a gas turbine engine 100 is depicted in FIG. 2, in accordance with various embodiments. In various embodiments, mid bearing compartment 300 may comprise engine structure 310 and a towershaft 320. In various embodiments, mid bearing compartment 300 may comprise more than one towershaft 320. Towershaft 320 may be configured to be rotated about towershaft axis 104 by a bull gear 350, and a bevel gear 340 may be rotated in response to the rotation of towershaft 320. The rotation by towershaft 320 may be facilitated by towershaft bearing 330. Towershaft 320, towershaft bearing 330, bull gear 350, bevel gear 340, and/or other parts of gas turbine engine 100 may benefit from fluid (e.g., a lubricant such as oil) for lubrication. Therefore, fluid may be received in mid bearing compartment 300 by fluid distribution hardware 360.

In various embodiments, a towershaft support 200 may be coupled to engine structure 310 and towershaft 320. Towershaft support 200 may be disposed about central axis 102 and may be configured to couple to and support towershaft 320. Additionally, towershaft support 200 may be configured to receive fluid from fluid distribution hardware 360 and provide fluid to various components of gas turbine engine 100.

Figure 3A:
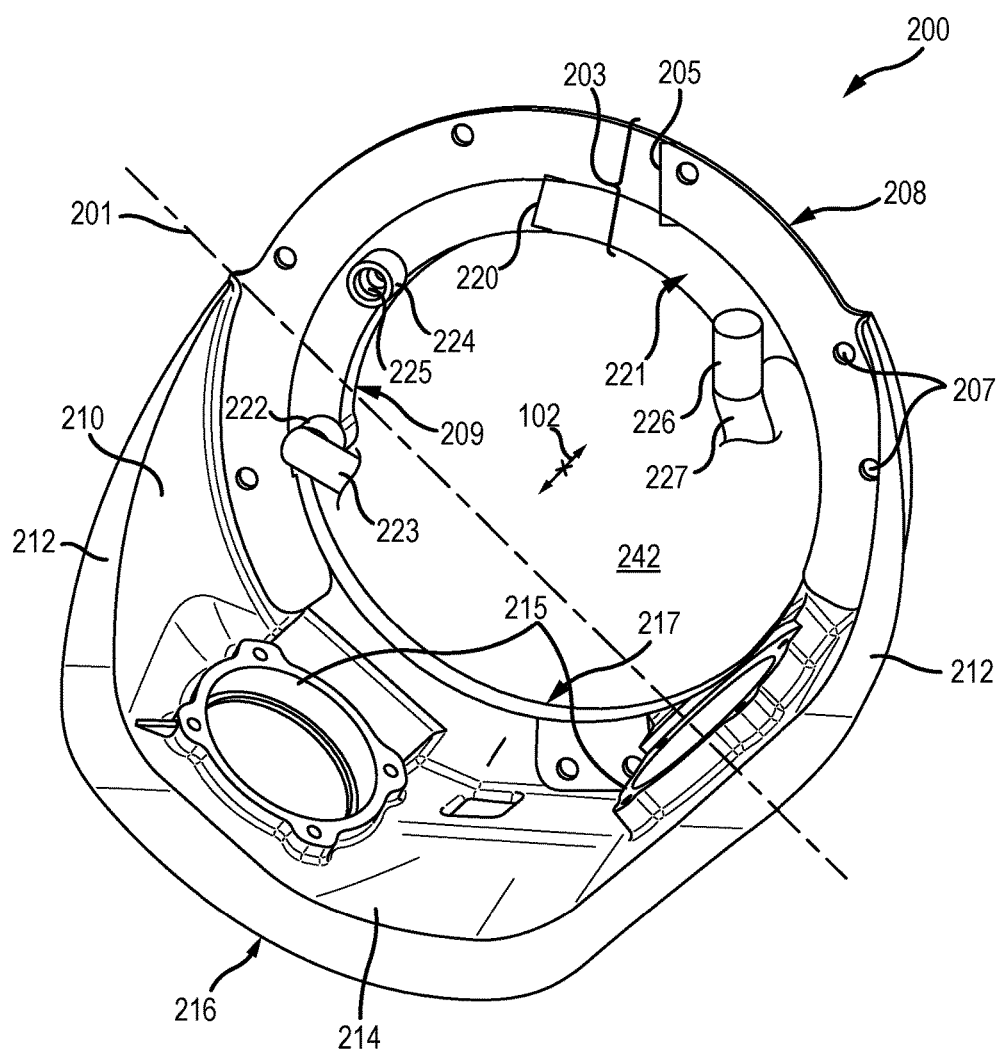
FIG. 3A illustrates a perspective view of a towershaft support, in accordance with various embodiments.
Figure 3B:
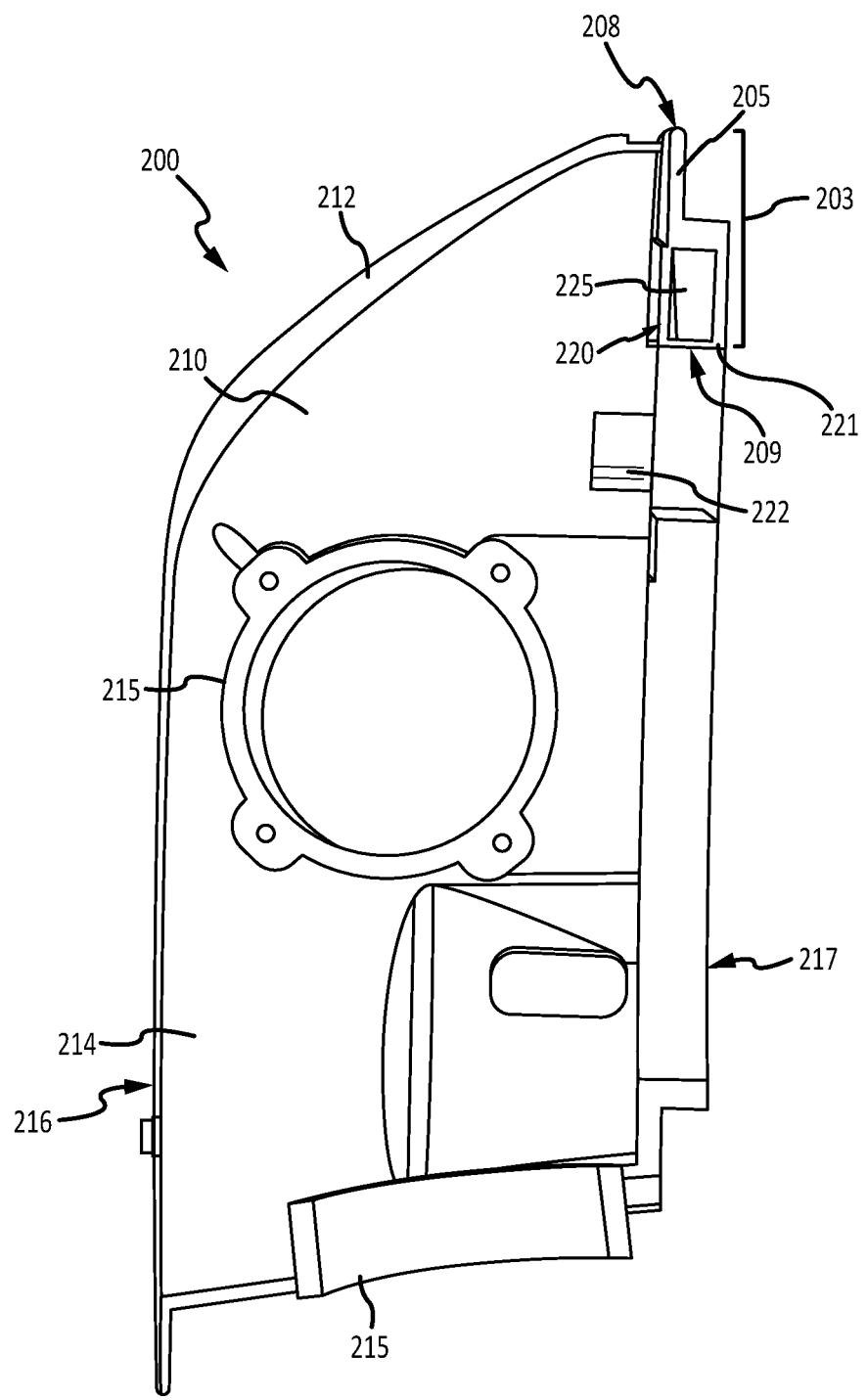
FIG. 3B illustrates a perspective cross-sectional view of a towershaft, in accordance with various embodiments.

Towershaft support 200 is depicted in FIG. 3A, in accordance with various embodiments. FIG. 3B depicts a cross-sectional view of towershaft 200 along line 201 shown in FIG. 3A. With combined reference to FIGS. 3A and 3B, towershaft support 200 may comprise a mount support 210 comprising a mount base 214 and side walls 212 protruding from mount base 214 on either side of mount base 214. Mount support 210 may be disposed semi-circumferentially (i.e., partially around the entire circumference) about central axis 102. Collectively, mount base 214 and side walls 212 of mount support 210 form a semicircle, U-shape, partial cylinder, or any other suitable shape about central axis 102. Mount support 210 may comprise a forward portion 216 and an aft portion 217.

In various embodiments, a mounting ring 203 may be coupled, or integrally coupled, to the aft portion 217 of mount support 210, wherein mounting ring 203 is coupled to mount base 214 and side walls 212 of mount support 210 radially inward of mount base 214 and side walls 212. As used herein, two items being "integrally coupled" means the two items are coupled such that the two pieces are part of a monolithic whole. Mounting ring 203 and mount support 210 may form a perimeter about central axis 102, which defines a central void 242.

In various embodiments, mounting ring 203 may comprise a mounting flange 205 on an outer diameter 208 of mounting ring 203 and a fluid passageway 220 on an inner diameter 209 of mounting ring 203. Mounting flange 205 may comprise at least one mounting hole 207, through which a fastener (e.g., bolt, screw, or the like) may be disposed to couple mounting flange 205 and towershaft support 200 to engine structure 310.

In various embodiments, fluid passageway 220 may be fixedly coupled (e.g., by welding, brazing, an adhesive, and/or the like) and/or integrally coupled to mounting flange 205. As used herein, two parts being "fixedly coupled" includes the two parts being integrally coupled. Fluid passageway 220 may comprise an outer wall 221 which encloses an internal passage 225 (visible in FIG. 3B, and in FIG. 3A through a fluid inlet 224) configured to pass fluid therethrough. Internal passage 225 may be sized such that internal passage 225 may house and/or pass any desired amount of fluid. Fluid passageway 220 may comprise at least one fluid inlet 224 in fluid communication with internal passage 225, through which fluid passageway 220 may receive fluid (e.g., oil) from fluid distribution hardware 360, and at least one fluid outlet in fluid communication with internal passage 225, through which fluid may travel to other components of a gas turbine engine from internal passage 225. For example, a fluid outlet may be a jumper tube mount 222, to which a jumper tube 223 may couple and act as a conduit for fluid to travel from internal passage 225 to other parts of the engine (e.g., bevel gear 340 and/or bull gear 350). As another example, a fluid outlet of fluid passageway 220 may be a nozzle mount 226, to which a nozzle 227 or tubing may couple to apply (e.g., spray) fluid to a desired component in the gas turbine engine (e.g., towershaft bearing 330). In various embodiments, fluid inlet 224 may be disposed between two fluid outlets. In various embodiments, fluid passageway 220 may comprise more than one fluid inlet 224 and/or more than one, or more than two, fluid outlets, depending on how many components are desired to receive fluid, and/or the amount of fluid each component is desired to receive, within the gas turbine engine.

Fluid passageway 220 being fixedly and/or integrally coupled to mounting flange 205 allows fluid to be passed and distributed to various components of an engine without having to couple multiple tubes or conduits to mounting ring 203 and/or towershaft support 200, spanning between fluid distribution hardware and the respective part. In this manner, fluid passageway 220 provides a common conduit (internal passage 225), from which fluid may be supplied to multiple tubes and nozzles through various fluid outlets and distributed to various engine components. Fluid passageway 220 being disposed on an inner diameter 209 of mounting ring 203 and being fixedly and/or integrally coupled with mounting flange 205 causes fluid passageway 220 to occupy little or no space forward or aft of mounting ring 203.

In FIG. 2, towershaft support 200 is installed in mid bearing compartment 300 of gas turbine engine 100 (FIG. 1). With combined reference to FIGS. 2 and 3, mount support 210 may comprise at least one towershaft mount 215 through which a towershaft 320 may be disposed. Towershaft mount 215 may be coupled to towershaft 320 to support towershaft 320. In various embodiments, towershaft support 200 may comprise two towershaft mounts 215 which may couple to and support two towershafts 320 of a gas turbine engine.

Figure 4:
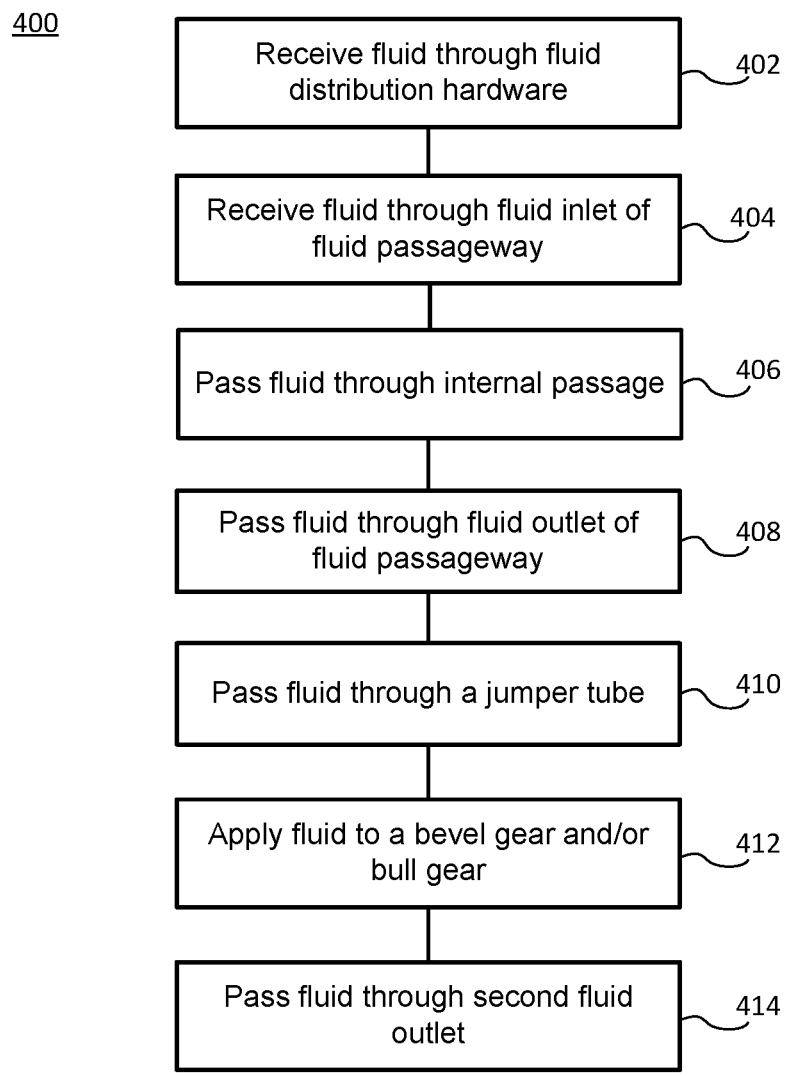
FIG. 4 illustrates a method for providing fluid to components of a gas turbine engine, in accordance with various embodiments.

A method 400 for providing fluid to components of a gas turbine engine is depicted in FIG. 4, in accordance with various embodiments. With combined reference to FIGS. 1-4, in various embodiments, gas turbine engine 100 may receive fluid (e.g., oil) through fluid distribution hardware 360 (step 402), which may be provided from outside of gas turbine engine 100. Towershaft support 200 may receive fluid from fluid distribution hardware 360 through fluid inlet 224 of fluid passageway 220 (step 404). The fluid may be passed through internal passage 225 (step 406) of fluid passageway 220, and through a fluid outlet of fluid passageway 220 (step 408), such as jumper tube mount 222 and nozzle mount 226. As discussed above, there may be any number of desired fluid inlets and/or fluid outlets. To supply components of gas turbine engine 100 with fluid, fluid may pass through jumper tube 223 (step 410) coupled to jumper tube mount 222, and a nozzle coupled to jumper tube 223 may apply fluid to a component of gas turbine engine 100 (e.g., bevel gear 340 and/or bull gear 350) (step 412). In various embodiments, fluid may be passed through a second fluid outlet (step 414) (e.g., nozzle mount 226) to be applied to another part of gas turbine engine 100.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A towershaft support, comprising:
a mount support; and
a mounting ring coupled to an aft portion of the mount support radially inward of the mount support, wherein the mounting ring and the mount support create a perimeter around a central void,
wherein the mounting ring comprises a mounting flange on an outer diameter of the mounting ring and a fluid passageway on an inner diameter of the mounting ring fixedly coupled to the mounting flange, wherein the fluid passageway comprises an outer wall enclosing an internal passage configured to pass fluid therethrough.

2. The towershaft support of claim 1, wherein the fluid passageway comprises at least one fluid inlet and at least one fluid outlet in fluid communication with the internal passage.

3. The towershaft support of claim 2, wherein the fluid inlet is disposed between a first fluid outlet and a second fluid outlet of the fluid passageway.

4. The towershaft support of claim 1, wherein the mount support comprises a towershaft mount disposed on the mount support.

5. The towershaft support of claim 1, wherein the mounting flange comprises at least one mounting hole configured to facilitate coupling of the towershaft support to an engine structure.

6. A gas turbine engine, comprising:
an engine structure;
a towershaft; and
a towershaft support coupled to the engine structure and the towershaft, wherein the towershaft support comprises:
a mount support; and
a mounting ring coupled to an aft portion of the mount support radially inward of the mount support, wherein the mounting ring and the mount support create a perimeter around a central void,
wherein the mounting ring comprises a mounting flange on an outer diameter of the mounting ring and a fluid passageway on an inner diameter of the mounting ring fixedly coupled to the mounting flange, wherein the fluid passageway comprises an outer wall enclosing an internal passage configured to pass fluid therethrough.

7. The gas turbine engine of claim 6, wherein the mounting flange comprises at least one mounting hole.

8. The gas turbine engine of claim 7, further comprising a fastener disposed through the at least one mounting hole coupling the mounting flange to the engine structure.

9. The gas turbine engine of claim 6, wherein the fluid passageway comprises at least one fluid inlet and at least one fluid outlet in fluid communication with the internal passage.

10. The gas turbine engine of claim 9, further comprising a bevel gear and a bull gear coupled to the towershaft, and a jumper tube coupled to the at least one fluid outlet, wherein the jumper tube is configured to transport fluid from the internal passage to at least one of the bevel gear and the bull gear.

11. The gas turbine engine of claim 9, further comprising a nozzle fluidly coupled to the at least one fluid outlet configured to spray fluid.

12. The gas turbine engine of claim 9, wherein the fluid inlet is disposed between a first fluid outlet and a second fluid outlet of the fluid passageway.

13. The gas turbine engine of claim 6, wherein the mount support comprises a towershaft mount disposed on the mount support.

14. The gas turbine engine of claim 13, wherein the towershaft is disposed through the towershaft mount.

15. The gas turbine engine of claim 6, further comprising fluid distribution hardware fluidly coupled to the internal passage.

16. A method for distributing fluid to components of a gas turbine engine, comprising:
receiving a fluid through a fluid inlet of a fluid passageway of a mounting ring, wherein the fluid passageway comprises an internal passage in fluid communication with the fluid inlet, wherein the mounting ring is part of a towershaft support, and wherein the mounting ring further comprises a mounting flange fixedly coupled to the fluid passageway; and passing the fluid through the internal passage and out a fluid outlet of the fluid passageway fluidly coupled to the internal passage.

17. The method of claim 16, further comprising passing the fluid to the fluid inlet from fluid distribution hardware.

18. The method of claim 16, further comprising passing the fluid through a jumper tube in fluid communication with the fluid outlet in response to passing the fluid out the fluid outlet.

19. The method of claim 18, further comprising applying the fluid to at least one of a bevel gear and a bull gear in response to the passing the fluid through the jumper tube.

20. The method of claim 16, further comprising passing the fluid through a second fluid outlet of the fluid passageway that is fluidly coupled to the internal passage.

* * * * *